United States Patent [19]
Friedland et al.

[11] 3,785,389
[45] Jan. 15, 1974

[54] FLUID FLOW CONTROL SYSTEM

[75] Inventors: Harry Friedland; Addison W. Langill, both of Salt Lake City, Utah

[73] Assignee: Process Systems, Inc., Salt Lake City, Utah

[22] Filed: Aug. 9, 1971

[21] Appl. No.: 169,930

Related U.S. Application Data

[63] Continuation-in-part of Ser. No. 142,681, May 12, 1971, abandoned.

[52] U.S. Cl..................... 137/1, 137/608, 137/833, 251/122
[51] Int. Cl. ........ E03b 1/00, F17d 1/00, F15c 1/12
[58] Field of Search ................ 137/608, 1; 251/122; 255/201, 200

[56] References Cited
UNITED STATES PATENTS

| | | | |
|---|---|---|---|
| 3,513,876 | 5/1970 | Tarbox | 137/608 X |
| 3,516,436 | 6/1970 | Klaus et al. | 137/608 X |
| 3,530,884 | 9/1970 | Kutz | 137/608 |
| 3,646,963 | 3/1972 | Klee | 137/608 |
| 3,654,960 | 4/1972 | Kiernan | 137/608 |

*Primary Examiner*—Samuel Scott
*Attorney*—LeRoy T. Rahn et al.

[57] ABSTRACT

A plurality of individually actuatable, bistable digital valve elements interconnect an upstream manifold and a downstream manifold. Each valve element has a first orifice with an adjustable cross-sectional area, and a second orifice with a fixed cross-sectional area substantially larger than that of the first orifice. A bistable plug seals the second orifice in one state and clears the second orifice for fluid flow in the other state. The flow rate through the valve element is determined by the area of the first orifice, which comprises a cylindrical passage and an axially movable, tapered slug lying within the passage. The slug is integral with an externally exposed set screw that adjusts the first orifice area. The axis of the slug and screw are transverse to the direction of plug movement. The first orifice is located upstream of the second orifice near the inlet of the valve element. The individual valve elements are removably attached to a main block that houses the upstream and downstream manifold to form a module. A multicomponent mixing system is assembled by coupling the downstream and/or upstream manifolds of different modules to a central mixing block in which the interconnecting conduits and manifolds are formed.

19 Claims, 12 Drawing Figures

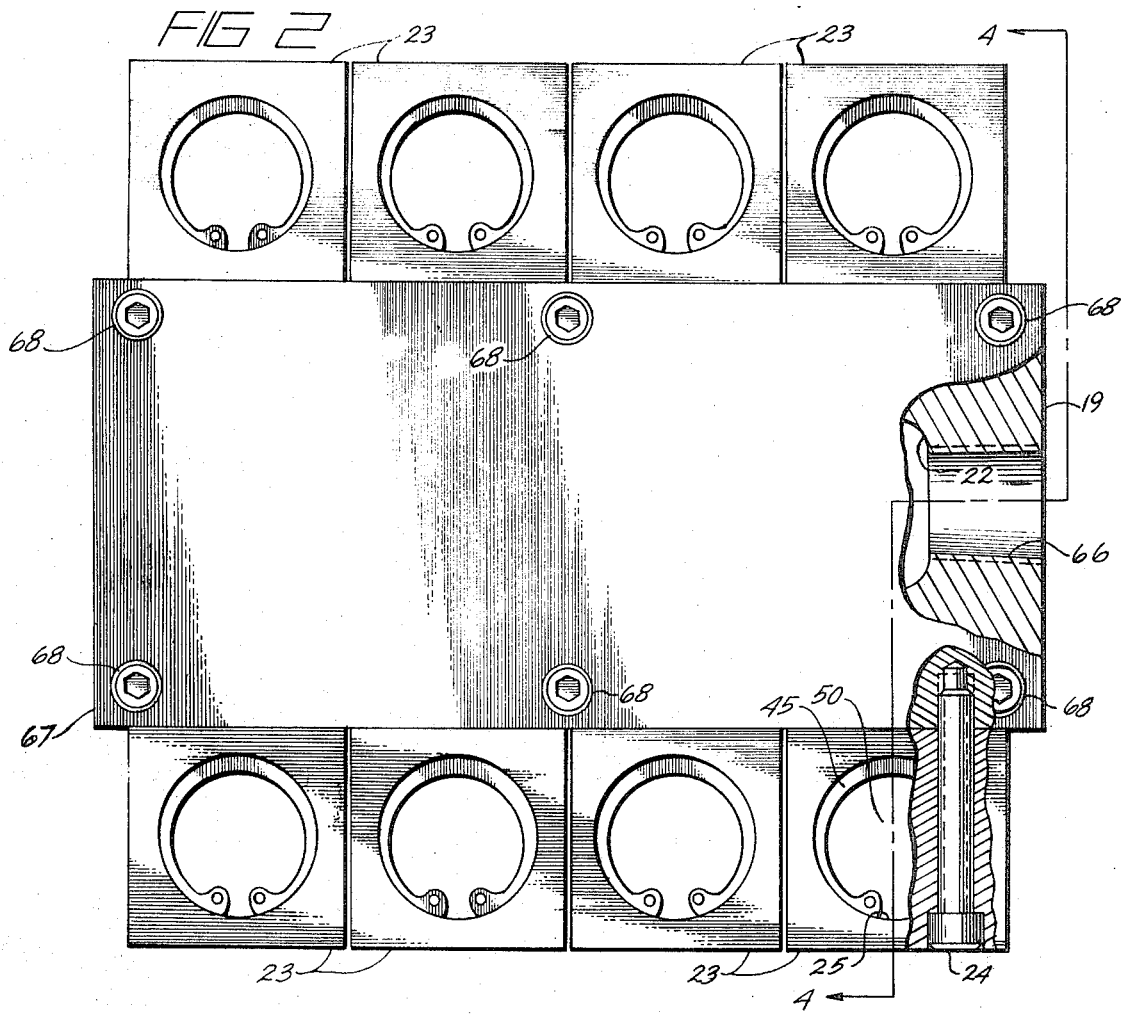
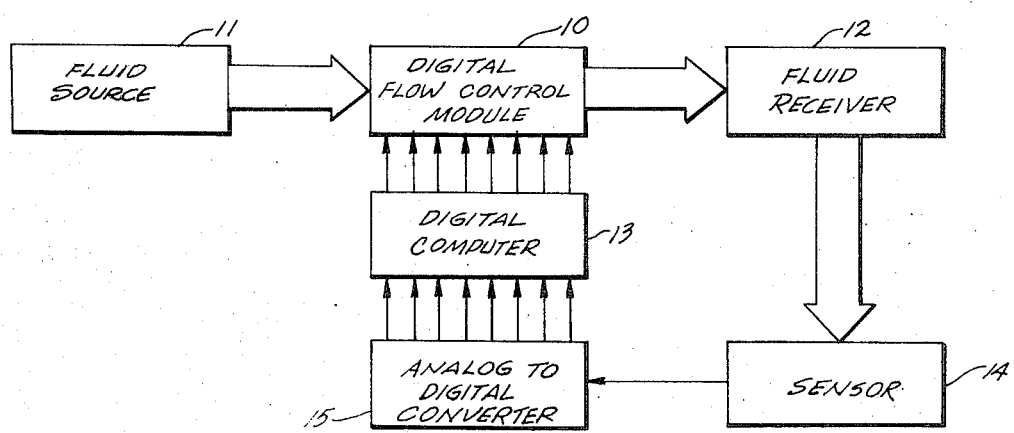

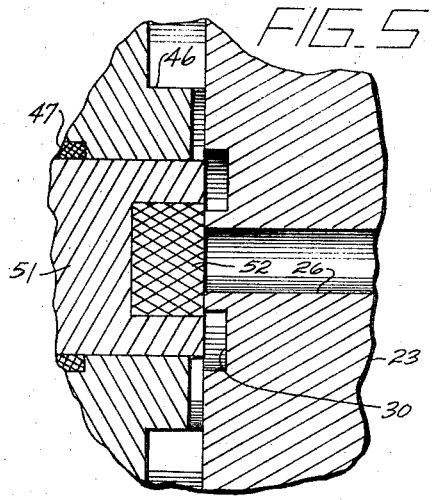
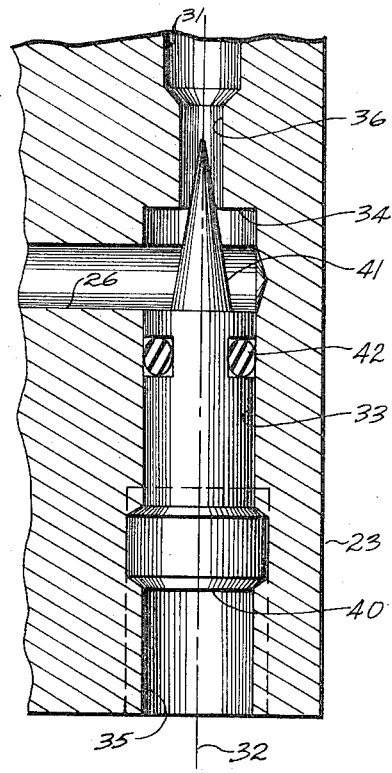
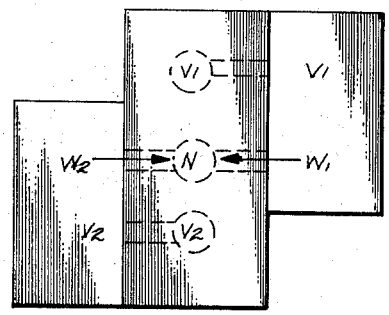
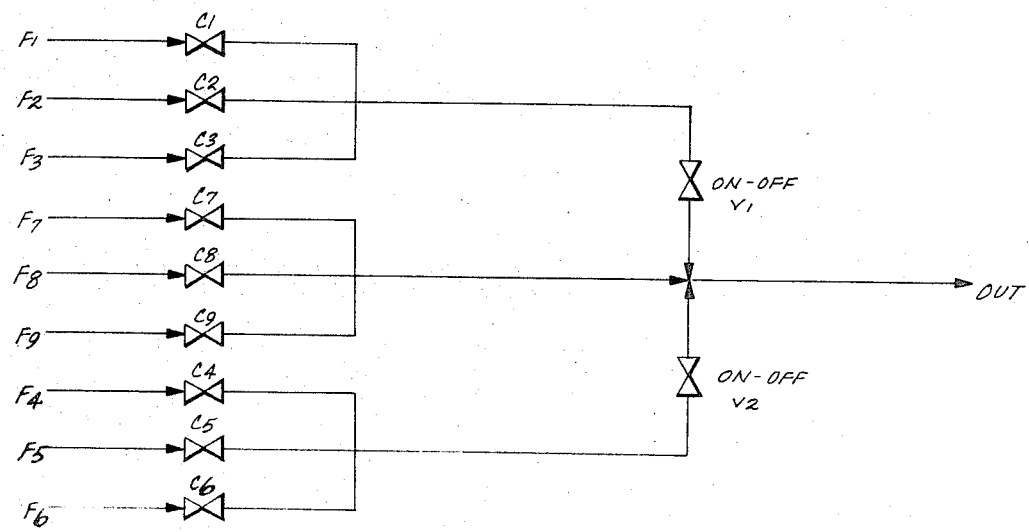

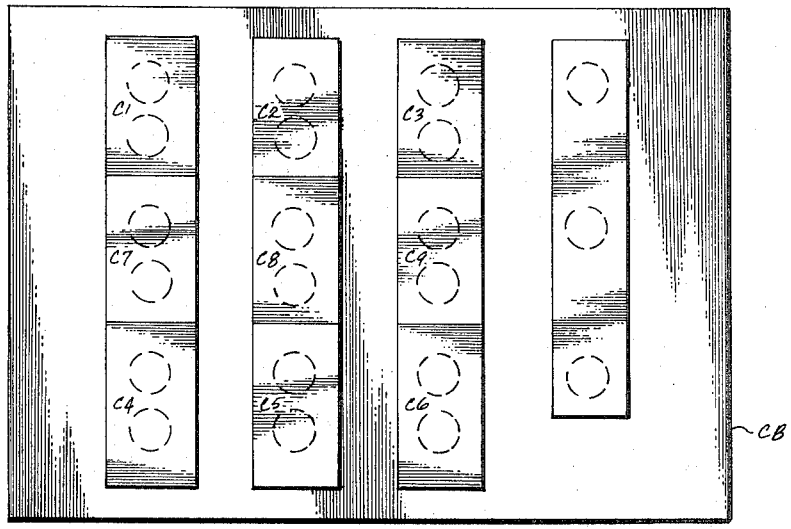
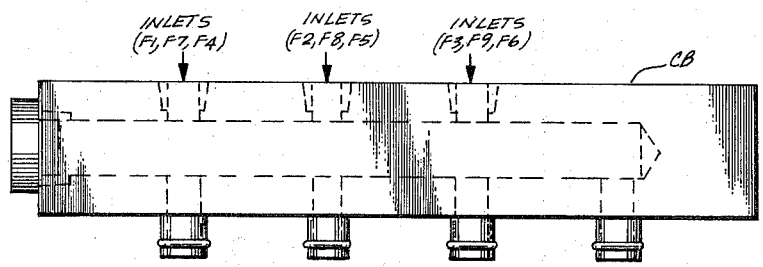
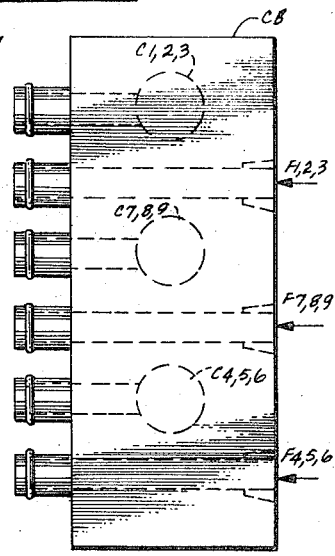
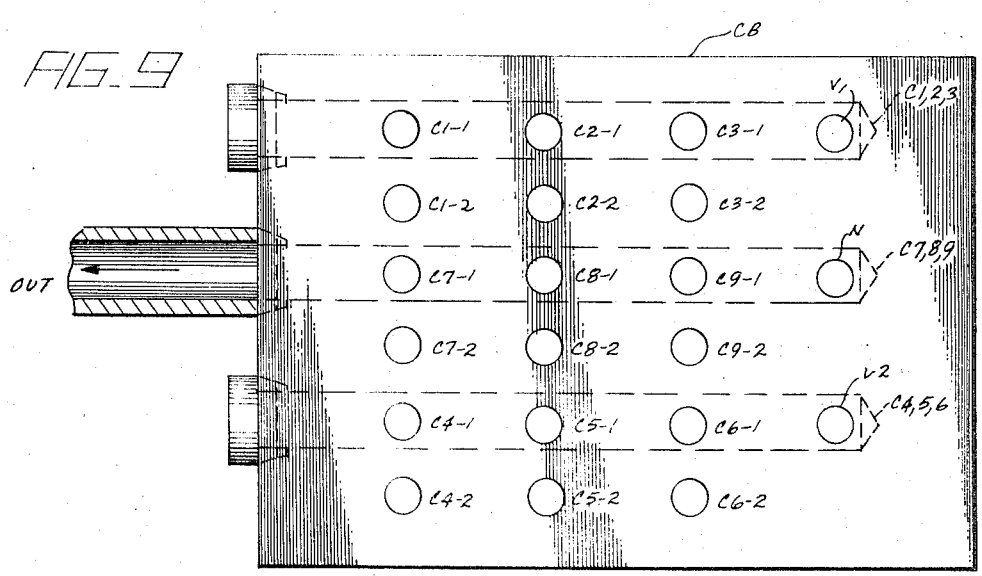

FLUID FLOW CONTROL SYSTEM

CROSS REFERENCE TO RELATED APPLICATIONS

This application is a continuation-in-part of our co-pending application Ser. No. 142,681, filed May 12, 1971, and now abandoned.

BACKGROUND OF THE INVENTION

This invention relates to the control of fluid flow and, more particularly, to new configurations for digital valve elements especially suited for low fluid flow rates.

In a copending application of Roger S. Hutton, Ser. No. 64,142, filed Aug. 3, 1970, and assigned to the assignee of the present application, there is disclosed a fluid flow control system employing a plurality of individually actuatable, bistable digital valve elements. In another copending application of Harry Friedland, Ser. No. 111,945, filed Feb. 2, 1971, and assigned to the assignee of the present application, there is disclosed new configurations for the valve elements of the Hutton fluid flow control system and improved arrangements for controlling such valve elements. For fluid flow control systems handling high and moderate flow rates, the features described in these applications ensure that change directly proportional to a repeatable linear function of the flow rate is directly proportional to the sum of the effective orifice areas of the open digital valve elements and serve to isolate the movable portion of the valve elements from the forces exerted by the downstream pressure in the system. The dimensions of the digital valve elements are sufficiently large that the tolerance requirements for achieving a high degree of accuracy can be met by standard mass production machining and manufacturing techniques. In contrast, in systems handling low fow rates, the dimensions of digital valve elements are so small that the tolerances substantially influence the flow rate through the open valve elements. Furthermore, at low flow rates the vena contracta effect and the upstream pressure variation along the direction of fluid flow, which are of prime concern in the Hutton application, become insignificant. For these reasons, the features described in these applications are not particularly well suited for the control of fluid flow at a low rate.

SUMMARY OF THE INVENTION

The invention calls for digital valve elements having adjustable effective orifice areas. Thus, calibration of the fluid flow control system by adjusting the individual valve elements to eliminate the effects of tolerance variations on the flow rate permits precise, i.e., repeatable control of fluid flow at low flow rates as a function of the combination of states of the valve elements.

A feature of the invention is the formation of a large sealable orifice and a small control orifice in each valve element. The cross-sectional area of the small orifice, which determines the fluid flow rate through the valve element, is adjustable. A bistable plug seals the large orifice in one state, thereby cutting off fluid flow through the valve element, and clears the large orifice in the other state, thereby establishing flow through the valve element at the rate determined by the effective cross-sectional area of the small orifice. Because the cross-sectional area of the small orifice determines the flow rate through the valve element, thermal expansion and wear, which affect the position of the plug and the cross-sectional area of the large orifice in the open state, do not affect the flow rate through the valve element.

Another feature of the invention, which is also disclosed in application Ser. No. 142,681, is the formation of the adjustable flow determining control orifice in a bistable valve element by placing a tapered axially movable slug inside a passage. The adjustable control orifice is defined by the annular space between the passage and the slug. The angle of convergence of the slug is small, so a relatively large axial movement of the slug produces a relatively small change in the area of the annular space. Thus, precise control can be exercised over the cross-sectional area of the adjustable control orifice.

A preferred embodiment of the invention combines the features mentioned in the two preceding paragraphs. The slug is integral with a threaded set screw that is exposed to the exterior of the module housing the digital valve elements. The plug moves in a direction transverse to the axis of the slug. The adjustable control orifice is located near the inlet of each digital valve element, i.e., upstream of the remaining components such as the plug assembly and its actuator.

Still another feature of the invention is the packaging arrangement. The module for controlling the flow of a single fluid comprises a main block containing an upstream manifold and a downstream manifold and a plurality of individual sub-blocks, each containing a digital valve element. The individual sub-blocks are removably attached to the main block so the valve elements communicate with the upstream and downstream manifolds in the main block. A system for mixing a plurality of component fluids is assembled from an equal number of the described modules which are coupled to a central block containing the manifolds and conduits required to carry out the mixing operation. The downstream and/or upstream manifolds of the individual modules are coupled to the central block. This permits all the fluidic and/or electrical connections to the system to be made in the central block. Consequently, these connections do not have to be disturbed to remove the modules for repair or replacement.

BRIEF DESCRIPTION OF THE DRAWINGS

The features of a specific embodiment of the best mode contemplated of carrying out the invention are illustrated in the drawings, in which:

FIG. 1 is a schematic block diagram of a fluid flow control system incorporating the principles of the invention;

FIG. 2 is a top plan view of the digital flow control module shown in block form in FIG. 1;

FIG. 5 is an enlarged view of the sealing orifice and plug assembly shown in FIG. 4;

FIG. 6 is an enlarged view of the adjustable control orifice shown in FIG. 4;

FIG. 7 is a schematic diagram of a multi-component fluid mixing system built from modules of the type shown in FIG. 2;

FIG. 8 is a simplified front elevation view of the mixing system shown schematically in FIG. 7;

FIGS. 9, 10, and 11 are front, top, and side views, respectively, of the central block of the mixing system shown in FIG. 8; and FIG. 12 is a front elevation view of the flow diverting module shown in FIG. 8.

DETAILED DESCRIPTION OF THE SPECIFIC EMBODIMENT

Figure 3:
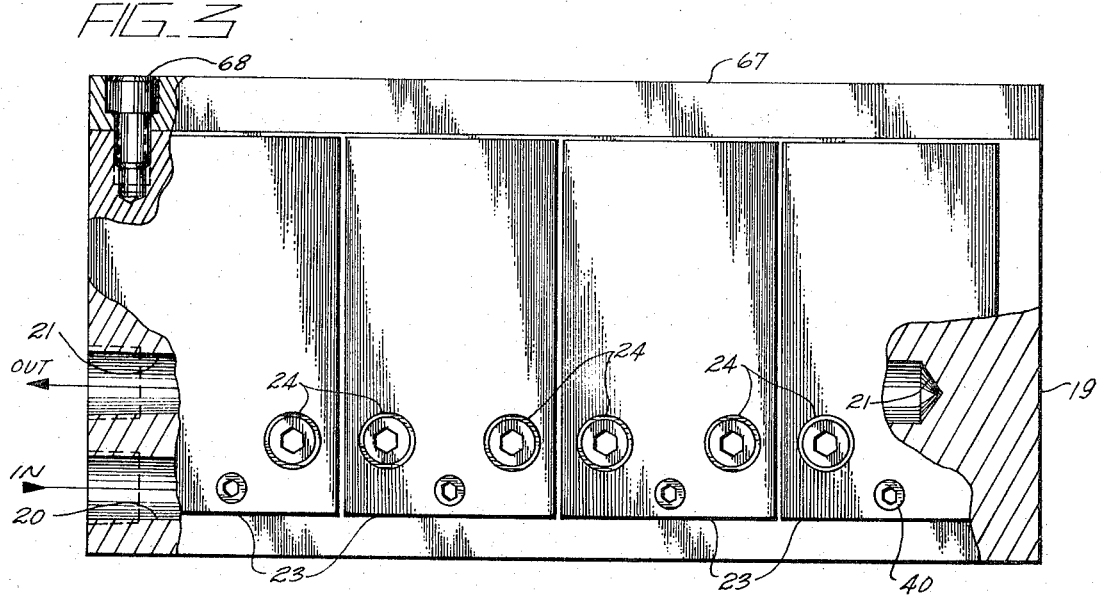
FIG. 3 is a side elevation view of the module of FIG. 2.

In FIG. 1, a digital flow control module 10 is shown in block form. The single lined arrows represent electrical connections and the solid double lined arrows represent fluidic connections. Module 10 controls the flow rate from a fluid source 11 to a fluid receiver 12, at a lower pressure than source 11. Source 11 and receiver 12 could be conduits in a fluid transmission, metering, or mixing system that are respectively upstream and downstream of module 10. The output of a digital computer 13 comprises a plurality of binary signals together representing in a weighted binary code a digital command for establishing the flow rate through module 10. The nature of the binary code is not essential to the invention. For example, a straight geometric progression of two, a modified geometric progression of two as taught in application Ser. No. 64,142, or an equal weighting of all the signals could be employed. For the purpose of discussion, it is assumed that the binary code is an eight digit straight binary progression of two, i.e., the binary signals are weighted 1, 2, 4, 8, 16, 32, 64, and 128. If the pressure in the system is not too high, such a straight geometric binary code is preferred. The binary output signals produced by digital computer 13 are coupled to module 10 where they respectively control an equal number of individually actuatable, bistable digital valve elements (not shown in FIG. 1). The flow rate through module 10 depends upon the states, i.e., open or closed, of the individual digital valve elements controlled by the respective binary output signals of digital computer 13. When a binary output signal of digital computer 13 is in one state, the corresponding digital valve element is closed, and when it is in the other state, the corresponding digital valve element is open. The effective orifice areas of the digital valve elements in the open state are related to each other in the same ratio that the respective binary output signals of digital computer 13 are weighted. Accordingly, the flow rate through module 10 is proportional to the digital command represented by the binary output signals from digital computer 13.

Since there are actually a number of different orifices in each digital valve element, the term "effective orifice area of a digital valve element" is used in this specification to indicate the resultant orifice area presented by the valve element considered as a single hole having a uniform cross-sectional area coupling source 11 to receiver 12.

The dynamic conditions of the fluid in receiver 12 are detected by a sensor 14, which produces one or more electrical feedback signals representative of these dynamic conditions. The electrical feedback signal is coupled from sensor 14 to an analog-to-digital converter 15, where it is converted to an eight digit binary representation for application to digital computer 13. Digital computer 13 continually readjusts the command signal on the basis of the changes of the dynamic conditions detected by sensor 14. Although the invention is disclosed in FIG. 1 in connection with a closed loop feedback control system, it can also be employed in an open loop control system or a control system that detects the dynamic conditions upstream of module 10.

Module 10 is shown in detail in FIGS. 2 through 6. A main rectangular block 19, which could be machined from any suitable metallic bar stock, has an upstream manifold 20, a downstream manifold 21, and a wiring cavity 22. Manifolds 20 and 21 could be formed by drilling parallel bores partially through block 19 and forming threads at the entrance of the bores for connection to inlet and outlet conduits. Cavity 22 is elongated and parallel to manifolds 20 and 21. A plurality of eight rectangular sub-blocks 23, each of which houses a digital valve element, are attached to main block 19 by fasteners such as cap screws 24. The construction of a digital valve element in one of sub-blocks 23 is shown in the drawings.

Sub-blocks 23, which are made from bar stock of a magnetic material such as B-1113 carbon steel, are each formed in the following manner: A large solenoid assembly cavity 25 is drilled into sub-block 23. A substantially smaller connecting conduit 26 is drilled into the bottom of cavity 25 coaxially therewith. An annular snap ring retaining groove 29 is formed around the perimeter of cavity 25 near its top. A transverse wire carrying conduit 27 is drilled through sub-block 23 from its surface that abuts block 19 to cavity 25 near its top. A transverse downstream bore extension 28 is drilled through sub-block 23 from its surface that abuts block 19 to cavity 25 near its bottom. A transverse upstream bore extension 31 is drilled from the surface of sub-block 23 abutting block 19 along an axis 32 (FIG. 6) that intersects conduit 26. However, the drill that forms extension 31 stops short of intersecting conduit 26. A bore 33 is drilled along axis 32 from the surface of sub-block 23 opposite the surface abutting block 19. Bore 33 is drilled completely through to conduit 26 and a short distance beyond to form a shoulder 34. Threads are formed along a portion 35 at the entrance of bore 33. A small cylindrical passage 36 is drilled along axis 32 between the portion of bore 33 forming shoulder 34 and extension 31. An annular groove 30 (FIG. 5) is formed in the bottom of cavity 25 around conduit 26 to form a sealing lip.

A set screw 40, which is inserted in bore 33, has threads that mate with the threads of portion 35. A tapered, right conical slug 41, which is integral with set screw 40, extends from the end of set screw 40 into passage 36. The adjacent walls of passage 36 and slug 41 define an annular control orifice that determines the effective orifice area of the digital valve element. An annular groove formed around the side of set screw 40 retains an O-ring seal 42 that prevents leakage of fluid from conduit 26 to the atmosphere through bore 33. As set screw 40 is turned, slug 41 moves axially into and out of passage 36, thereby changing the inside diameter of the annular space of the control orifice. Because of the small angle of convergence of slug 41, a relatively large axial displacement of slug 41 produces a relatively small change in the cross-sectional area of the control orifice. Therefore, very precise control can be exercised over the effective orifice area of the digital valve element.

A stationary solenoid assembly 43 and a movable plug assembly 44 are inserted into cavity 25, where they are secured by a snap ring 45 retained in groove 29. Solenoid assembly 43 positions plug assembly 44 exclusively in one of two positions. Solenoid assembly 43 comprises a base 46 made from a magnetic material such as B-1113 carbon steel, a sleeve 47 made from a non-magnetic material such as 304 stainless steel, a bobbin 48 made from a non-magnetic material such as nylon, a solenoid coil 49 wrapped around bobbin 48, and a cap 50 made from a magnetic material such as B-1113 carbon steel. Plug assembly 44 comprises a plug body 51 made from a magnetic material such as B-1113 carbon steel, a sealing insert 52 made of a suitable sealing material such as an elastomer rubber, and a compression spring 53.

Figure 4:
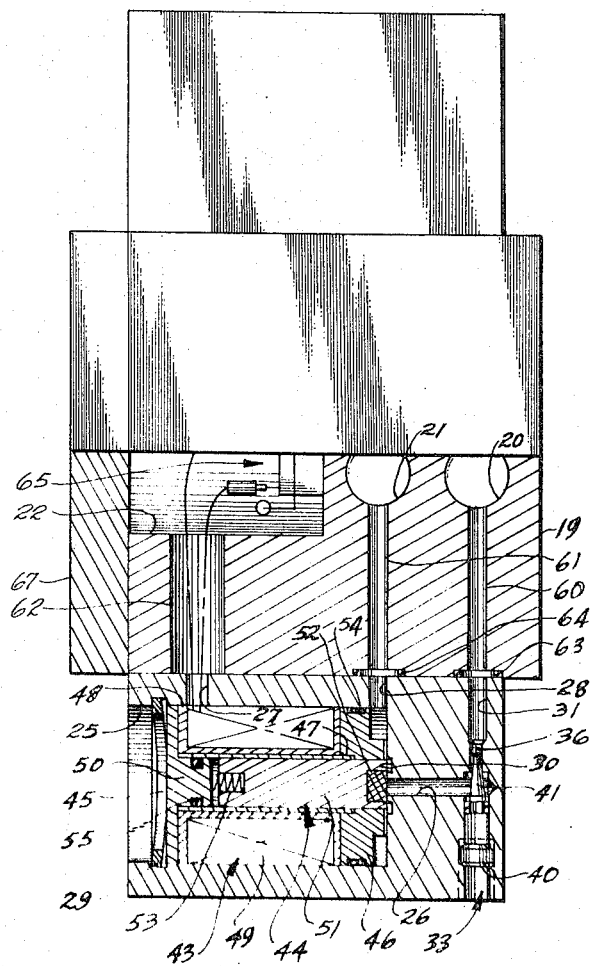
FIG. 4 is a partially sectional view of the module of FIG. 2 taken along the planes two in FIG. 2.

Base 46 and sleeve 47, which are permanently joined by brazing, are first inserted into cavity 25 so the end of base 46 is spaced somewhat from the bottom of cavity 25, as illustrated in FIGS. 4 and 5. Base 46 is dimensioned to fit tightly in cavity 25 so it does not move during operation and to form an annular peripheral groove at the end adjacent to the bottom of cavity 25. An O-ring seal 54, retained in an annular groove around the side of base 46, prevents leakage of fluid from extension 28 into cavity 25. Then, bobbin 48 is fitted around sleeve 47, and plug body 51 is placed inside sleeve 47 with insert 52 facing conduit 26. Next, spring 53 is placed in a spring retaining cavity at the end of plug body 51, and cap 50 is fitted over plug assembly 44 and bobbin 48. An O-ring seal 55, retained in an annular groove around cap 50, prevents the leakage of fluid out of cavity 25 between plug body 51 and sleeve 47. When solenoid coil 49 is deenergized, spring 53 urges plug body 51 away from cap 50 so insert 52 seals conduit 26 at the sealing lip formed by annular groove 30 and fluid flow through the valve element is cut off. Thus, the valve element is in its closed state. When solenoid coil 49 is energized by the application of an electrical signal representing one of the two binary states of one of the binary output signals of computer 13, a magnetic flux path is established through cap 50, sub-block 23, base 46, and plug body 51. As a result, plug body 51 is drawn up against cap 50 to clear conduit 26 for fluid flow through the digital valve element. Thus, the valve element is in its open state.

The digital valve elements housed in the remaining seven sub-blocks 23 are identical to the described digital valve element except for the dimensional changes required to provide different effective orifice areas.

As illustrated in FIG. 4 for the described digital valve element, all sub-blocks 23 are fluidically and electrically coupled to main block 19. Specifically, a transverse upstream bore 60 connects extension 31 to upstream manifold 20, a transverse downstream bore 61 connects extension 28 to downstream manifold 21, and a transverse bore 62 connects conduit 27 to wiring cavity 22. Counterbores for retaining O-ring seals 63 and 64 are also formed at the ends of bores 60 and 61, respectively. These O-ring seals prevent leakage of the fluid at the interface of main block 19 and sub-block 23.

All the necessary connections between digital computer 13 and the digital valve elements are made on a terminal board 65 mounted inside cavity 22. The individual wires for actuating each solenoid coil are routed from terminal board 65 to the digital valve element through bore 62 and conduit 27. The leads from digital computer 13 (not shown) are routed into wiring cavity 22 through an opening 66 (FIG. 2), at which point a connector could be installed if desired. A cover 67 for cavity 22 is secured to the top of main block 19 by fasteners such as screws 68.

When a valve element is in its open state, fluid from upstream manifold 20 flows through bore 60, extension 31, passage 36, conduit 26, the annular space between base 46 and the bottom of cavity 25, extension 28 and bore 61 to downstream manifold 21. In addition to the control orifice formed by the adjacent walls of passage 36 and slug 41, a number of other orifices including conduit 26 are formed in the flow path of the digital valve element. All of these orifices are substantially larger than the control orifice. As a result, the flow rate through the digital valve element is determined by the cross-sectional area of the control orifice, i.e., for a given pressure drop the flow rate through the digital valve element is solely a function of the changes in the cross-sectional area of the control orifice made by set screw 40. Changes in the dimensions of the other orifices or plug assembly 44 brought about by thermal expansion or wear do not appreciably influence the flow rate through the digital valve element. In this sense, plug body 51 is in the static fluid region of the flow through the control orifice, as taught in application Ser. No. 64,142, because changes in the position of plug body 51 in the open state of the valve element do not noticeably effect the flow rate through the control orifice.

It should be noted that contamination stemming from the components of the digital valve element, i.e., solenoid assembly 43 and plug assembly 44, cannot clog the control orifice because these contaminants are introduced into the fluid downstream of the control orifice. Thus, it is a significant aspect of the invention that the control orifice, which is very small and easily susceptible to blockage by contaminants, be placed near the inlet of the valve element and upstream of the plug, as shown.

It should further be noted that slug 41 moves in a direction transverse to the direction of movement of plug assembly 44. This is also a significant aspect of the invention because if facilitates layout of the components so the adjustment for the effective orifice area, i.e. set screw 40, is exposed to the exterior of the module.

The packaging arrangement of the module provides flexibility and facilitates replacement or repair. The module can be simply converted for use in the system described and claimed in our copending application entitled, "Fluidic Control System and Method for Calibrating Same," Ser. No. 169,940, filed concurrently herewith, now U.S. Pat. No. 3,726,296 issued Apr. 17, 1973. One of sub-blocks 23 housing a digital valve element is simply replaced by a similar sub-block housing only an adjustable bleed orifice, as illustrated in the concurrently filed application. In addition, downstream manifold 21 is drilled completely through main block 19, and a plug with the exhaust orifice as described in the concurrently filed application is inserted in the end of downstream manifold 21.

Modules with more digital valve elements are produced simply by extending the length of main block 19 and providing more sub-blocks 23. Replacement and repair can be carried out simply by releasing the fasteners of the defective valve element and replacing it with a new one. Thus, the module does not have to be removed from its position on line in a processing facility.

FIGS. 7 through 12 illustrate packaging features of the invention that permit module 10 to be used as a basic building block in the construction of a complex multicomponent fluid mixing system. FIG. 7 represents a typical gas flow control system that is making two products, P1 and P2. P1 consists of closely controlled quantities of six fluids (F1, F2, F3, F7, F8, and F9) while P2 consists of closely controlled quantities of six fluids (F4 through F9). Since F7, F8, and F9 are common to both products (although not necessarily with the same flow rates for both products), the system of FIG. 7 has these fluids common to both products, with mixture switching being accomplished with ON-OFF valves (V1 and V2). So, when product P1 is being made, V1 is ON and V2 is OFF, while when product P2 is being made, V1 is OFF and V2 is ON.

FIG. 8 shows an assembly drawing for constructing this system with no tubing requirements, using modules 10 coupled to a central block having mixing manifolds and connecting conduits. The nine fluids (F1 through F9) are supplied to central block CB, the one output line (OUT) is taken from the central block and all intermediate plumbing is accomplished internally within the central block.

Note that in FIG. 8 there are nine identical modules (C1 through C9) together with a "special" flow diverting module (V) that implements the two ON-OFF valves V1 and V2 of FIG. 7.

FIGS. 9, 10, and 11 show the internals of the central block. Three cavities are drilled into the central block, designated as C1, 2, 3 cavity, C4, 5, 6 cavity, and C7, 8, 9 cavity. Cavity C1, 2, 3 and cavity C4, 5, 6 are plugged at their open end as shown in FIG. 9. Four holes are drilled into each cavity from the front of the central block (FIG. 9). Holes C1-1, C2-1, C3-1, and V1 are drilled from the front of the central block into the C1, 2, 3 cavity, holes C7-1, C8-1, C9-1, and N are drilled into the C7, 8, 9 cavity, and holes C4-1, C5-1, C6-1, and V2 are drilled into the C4, 5, 6 cavity.

Connecting tubes, fitted with O-ring seals, are brazed into the front of the central block, concentric with these holes, as shown in FIG. 10. These tubes are connected to the downstream manifolds of the respective modules (C1 through C9).

The respective upstream manifolds of the modules are connected to holes C1-2, C2-2, – C9-2 drilled through the central block from the front to back. As shown in FIGS. 10 and 11, the nine fluids (F1 through F9) are respectively supplied to holes C1-2, C2-2, – C9-2 at the back of the central block. These fluids are connected directly through the central block to the modules. When a typical module is coupled to the central block (i.e., module C7), its upstream manifold is directly connected to the inlet fluid F7 through hole C7-2 of the central block while its downstream manifold is connected through hole C7-1 of the central block to the C7, 8, 9 cavity. The V module is designed to implement ON-OFF valves V1 and V2 of FIG. 7, and is coupled to the three holes V1, N, and V2 of FIG. 9.

FIG. 12 depicts one possible arrangement of the V module. The mixture of common components F7, F8, and F9 is combined with the remaining components required to form products P1 and P2 through the diverting action of the V module. Each of the two control blocks attached to the V module (blocks V1 and V2) are simple ON-OFF valves, designed with no internal orificing for maximum flow capacity.

When product P1 is being manufactured, flow of the components F1, F2, and F3 which are mixed in the C1, 2, 3 cavity is connected therefrom to the V module via hole V1. Control block V1 is in the ON state, while control block V2 is in the OFF state. Flow of the input mixture thus proceeds from connecting hole V1, through the open V1 control block, through the N connecting hole, and into the C7, 8, 9 cavity. There the input mixture combines with controlled amounts of components F7, F8, and F9 to form the product P1, which is taken from the C7, 8, 9 cavity.

When product P2 is being manufactured, control block V2 is in the ON state, while control block V1 is OFF. Flow of components F4, F5, and F6 thus proceeds from the C4, 5, 6 cavity, through connecting tube V2, control element V2, and tube N, into the C7, 8, 9 cavity. Mixture of components F4 through F9 there produces product P2. From a system point of view, the V module and the C1 through C9 modules are all controlled by a supervisory computer. In order to assure proper mixture of the ingredients, flow meters are installed in the nine inlet lines. When making P1, the six ingredient flow rates are fed back into the computer, and the computer in turn updates the ON-OFF status of the six appropriate modules (C1, C2, C3, C7, C8, and C9) to provide the correct flow rate. In some cases, the central block may be constructed from several sections bolted together to form a complete unit, with O-ring seals used to ensure leak-tight joints between the different sections. The electrical connections from the computer can also be routed through wire carrying conduits (not shown) in the central block to the individual modules V and C1-C9. Alternatively, the electrical connections and the individual fluid components could bypass the central block and be directly supplied to modules C1-C9.

In summary, holes C1-1, C2-1, – C9-1, holes C1-2, C2-2, – C9-2, and holes V1, N, and V2 serve as connecting conduits and cavity C1, 2, 3, cavity C4, 5, 6, and cavity C7, 8, 9 serve as mixing manifolds within the central block.

To calibrate module 10, a calibrating fluid such as air is supplied to upstream manifold 20 so the pressure therein is constant and high enough to ensure that the pressure ratio from manifold 20 to manifold 21 is larger than the critical pressure ratio for all combinations of states of digital valve elements. Thus, fluid flow through the open digital valve elements is at sonic velocity irrespective of the pressure drop between manifolds 20 and 21. In the case of air, the constant pressure in upstream manifold 20 would be at least twice the pressure in downstream manifold 21. A mass flowmeter is connected in series with downstream manifold 21. Each valve element in turn is opened and its set screw adjusted until the flow rate indicated by the flowmeter is at the value representative of the weighted value of the binary signal that actuates such valve element. After each valve element is so adjusted, its set screw is permanently secured against rotation by filling its bore with a bonding agent or by other means. Preferably, each valve element is opened while it is adjusted and then closed during the adjustment of the other valve elements, so only one valve element is open at a time.

The described embodiment of the invention is only considered to be prefered and illustrative of the inventive concepts; the scope of the invention is not to be restricted to such embodiment. Various and numerous other arrangements may be devised by one skilled in

What is claimed is:

1. A method for calibrating a digital flow control module having a plurality of binary digital valve elements interconnecting a first manifold and a second manifold and means for adjusting the effective orifice areas of the valve elements, the method comprising the steps of:

coupling to the first manifold a fluid under sufficient pressure so that for all combinations of states of the valve elements the ratio of the pressure in the first manifold to the pressure in the second manifold exceeds the critical pressure ratio for the fluid;

measuring the flow rate of the fluid from the first manifold to the second manifold;

opening each valve element in turn and adjusting its effective orifice area while open until the measured flow rate reaches a desired value representative of the weight assigned to such valve element.

2. The method of claim 1, in which the valve elements are individually opened and adjusted, each valve element being closed after its effective orifice area is adjusted.

3. A multicomponent fluid mixing system comprising:

a central block in which one or more mixing manifolds and connecting conduits are formed;

a plurality of sources of component fluids to be mixed, the sources being coupled to the conduits in the central block;

a plurality of digital flow control modules equal in number to the sources each having an upstream manifold coupled to one of the conduits in the central block, a downstream manifold coupled to one of the mixing manifolds in the central block, and a plurality of individually actuatable bistable digital valve elements interconnecting the upstream and downstream manifolds; and a receiver of mixed fluid coupled to one or more of the mixing manifolds of the central block.

4. A fluid flow control system comprising:

a source of fluid under pressure;

a fluid receiver at a lower pressure than the source; and a plurality of individually actuatable, binary digital valve elements interconnecting the source to the receiver, each valve element having means for forming a first orifice with an adjustable orifice area, means for forming a second orifice with a fixed orifice area substantially larger than the adjustable orifice area, means for forming a fluid flow passage from the sources to the receiver through the first and second orifices such that the first orifice is upstream of the second orifice in the flow passage and the adjustable orifice area is determinative of the flow rate through the flow passage, and a bistable plug positionable exclusively in a first state or a second state, the plug sealing the second orifice in the first state to cut off fluid flow through the flow passage and clearing the second orifice in the second state to establish fluid flow through the flow passage at a flow rate determined by the orifice area of the first orifice.

5. A digital flow control module comprising:

a main block having an upstream fluid manifold and a downstream fluid manifold;

a plurality of sub-blocks removably attached to the main block, each sub-block housing an individually actuatable, binary digital valve element coupled between the upstream and downstream manifolds, each valve element having a plug that moves back and forth along a first axis between an open position where fluid flow through the element takes place and a closed position where no fluid flow through the element takes place; and an externally exposed adjustment screw for each sub-block, the adjustment screw being movable along a second axis transverse to the first axis to control the effective orifice area of the corresponding valve element in the open position.

6. The module of claim 5, in which each sub-block has means for forming a passage through which the fluid flows through the valve element from the upstream manifold to the downstream manifold and means for forming a small orifice in the passage, and the externally exposed adjustment screw comprises a set screw having a threaded connection with the sub-block and a tapered slug integral with the set screw, the slug extending into the small orifice to form an annular space the cross-sectional area of which changes as the set screw is turned.

7. The module of claim 6, in which each sub-block has means for forming in the passage a sealable orifice with a substantially larger cross-sectional area than the annular space, the plug sealing the sealable orifice in the closed position to prevent fluid flow through the passage and unsealing the sealable orifice in the open position to permit fluid flow through the passage.

8. The module of claim 7, in which the upstream and downstream manifolds are parallel, elongated passages and the sub-blocks are attached to the main block in a row parallel to the manifolds.

9. The module of claim 8, in which the main block has an elongated wiring cavity generally parallel to the manifolds; an electrical terminal board disposed in the wiring cavity; a first plurality of wire carrying conduits corresponding to the respective digital valve elements extending between the wiring cavity and the respective sub-blocks; a second plurality of fluid conduits corresponding to the respective valve elements extending between the upstream manifold and the respective sub-blocks; and a third plurality of fluid conduits corresponding to the respective valve elements extending between the downstream manifold and the respective sub-blocks, the first, second, and third plurality of conduits being parallel to each other and transverse to the manifolds, and each plug being electrically actuated by wires extending to the corresponding sub-block from the wiring cavity through the corresponding wiring conduit.

10. A fluid flow control system comprising:

a source of fluid at a first pressure;

a fluid receiver at a second pressure lower than the first pressure;

a plurality of individually actuatable, binary digital valve elements interconnecting the source to the receiver, each valve element having means for forming a fluid flow passage through the valve element, means for forming an orifice in the flow passage, a slug having a tapered surface positioned in the orifice to form a flow determining annular space in the flow passage, means for adjusting the axial position of the slug to change the cross-sectional area of the annular space, and bistable means for controlling the fluid flow through the valve element so the fluid flow through the flow passage is either zero or a value determined by the cross-sectional area of the annular space;

a plurality of sources of binary signals corresponding to the respective plurality of digital valve elements and representing together a digital command for establishing the flow rate from the source to the receiver through the digital valve elements; and means for coupling the signal sources to the bistable means of the respective digital valve elements to provide fluid flow that is either zero or a value determined by the cross-sectional area of the annular space depending upon the value of the binary signal from the source coupled thereto.

11. The digital valve element of claim 10, in which the means for adjusting the axial position of the slug comprises means for forming a threaded bore coaxial with the orifice and a set screw having threads mating with the threads of the bore, the set screw being integral with the slug.

12. The digital valve element of claim 10, in which the orifice is a circle and the slug is a right cone coaxial with the circle.

13. The digital valve element of claim 10, in which the bistable means for controlling the fluid flow through the valve element comprises means for forming in the flow passage a sealing orifice with a cross-sectional area substantially larger than the annular space and a bistable plug positionable exclusively in a first state or a second state, the plug sealing the sealable orifice in the first state and clearing the sealable orifice in the second state.

14. A fluid flow control system comprising:
a source of fluid at a first pressure;
a fluid receiver at a second pressure lower than the first pressure;
a plurality of individually actuatable binary digital valve elements interconnecting the source to the receiver, each valve element having a fluid flow passage through which fluid flows from the source to the receiver a first orifice formed in the fluid flow passage, a second orifice having a substantially larger cross-sectional area than the first orifice formed in the flow passage, all the fluid flowing from the source to the receiver flowing through the first and second orifices, a plug movable into one of two positions to seal the second orifice in one position and to unseal the second orifice in the other position, and means responsive to a binary signal for actuating the plug into one of the two positions;

a plurality of sources of binary signals corresponding to the respective digital valve elements and representing together a digital command to determine the flow rate through the system; and means for coupling the sources to the actuating means of the respective digital valve elements to place the plugs of such valve elements in one of the two positions depending upon the value of the corresponding binary signal.

15. The fluid flow control system of claim 14, in which the plug lies in the fluid stream of the second orifice in the other position.

16. The fluid flow control system of claim 14, in which the cross-sectional areas of the first orifice of at least some of the valve elements vary according to a geometric progression.

17. The fluid flow control system of claim 14, in which the first orifice lies nearer the source in the flow passage than the second orifice.

18. The fluid flow control system of claim 14, in which the cross-sectional area of the first orifice is adjustable.

19. The fluid flow control system of claim 14, additionally comprising for each digital valve element means responsive to a set screw movable transverse to the movement of the plug for adjusting the cross-sectional area of the first orifice.

* * * * *

PO-1050
(5/69)

7642

UNITED STATES PATENT OFFICE
CERTIFICATE OF CORRECTION

Patent No. 3,785,389    Dated January 15, 1974

Inventor(s) Harry Friedland and Addison W. Langill

It is certified that error appears in the above-identified patent and that said Letters Patent are hereby corrected as shown below:

Patent column 1, line 37, change "fow" to --flow--.

Patent column 2, line 59, change "along the planes two in FIG. 2" to --along the two planes designated in FIG. 2--.

Patent column 6, line 42, change "because if facilitates" to --because it facilitates--.

Patent column 9, line 54, change "sources" to --source--.

Signed and sealed this 26th day of November 1974.

(SEAL)
Attest:

McCOY M. GIBSON JR.
Attesting Officer

C. MARSHALL DANN
Commissioner of Patents